(12) United States Patent
Fukase et al.

(10) Patent No.: US 8,828,567 B2
(45) Date of Patent: Sep. 9, 2014

(54) MICROBIAL POWER GENERATION DEVICE

(75) Inventors: Tetsuro Fukase, Tokyo (JP); Nobuhiro Orita, Tokyo (JP)

(73) Assignee: Kurita Water Industries Ltd., Tokyo (JP)

(*) Notice: Subject to any disclaimer, the term of this patent is extended or adjusted under 35 U.S.C. 154(b) by 71 days.

(21) Appl. No.: 12/801,697

(22) Filed: Jun. 21, 2010

(65) Prior Publication Data

US 2010/0330397 A1 Dec. 30, 2010

Related U.S. Application Data

(63) Continuation of application No. PCT/JP2008/072385, filed on Dec. 10, 2008.

(30) Foreign Application Priority Data

Dec. 21, 2007 (JP) ................................. 2007-329691

(51) Int. Cl.
| | |
|---|---|
| H01M 8/16 | (2006.01) |
| H01M 8/24 | (2006.01) |
| H01M 8/02 | (2006.01) |
| H01M 8/04 | (2006.01) |

(52) U.S. Cl.
CPC ................. H01M 8/16 (2013.01); H01M 8/248 (2013.01); H01M 8/0232 (2013.01); H01M 8/0234 (2013.01); H01M 8/0245 (2013.01); Y02E 60/527 (2013.01); H01M 8/0271 (2013.01); H01M 8/0297 (2013.01); H01M 8/04194 (2013.01)
USPC .............................................. 429/2; 429/401

(58) Field of Classification Search
USPC .............................. 429/2, 401, 505, 515, 530
See application file for complete search history.

(56) References Cited

U.S. PATENT DOCUMENTS

| | | | |
|---|---|---|---|
| 5,976,719 A | 11/1999 | Kim et al. | |
| 2007/0259216 A1* | 11/2007 | Logan | 429/2 |
| 2010/0119920 A1* | 5/2010 | Logan et al. | 429/46 |
| 2010/0178530 A1* | 7/2010 | Min et al. | 429/2 |

FOREIGN PATENT DOCUMENTS

| | | |
|---|---|---|
| JP | 10-233226 | 9/1998 |
| JP | 2000-133326 | 5/2000 |
| JP | 2004-342412 | 12/2004 |

(Continued)

OTHER PUBLICATIONS

International Search Report for PCT/JP2008/072385, mailed on Feb. 24, 2009.

(Continued)

*Primary Examiner* — Mark F Huff
*Assistant Examiner* — Monique Wills

(57) ABSTRACT

A microbial power generation device includes an anode chamber which maintains a microbe and which is supplied with influent which includes an electron donor, a cathode chamber supplied with an electron acceptor, a nonconductive membrane having a first face and an opposing second face and arranged between the anode chamber and the cathode chamber, a first electro-conductive support material having a rough surface which has asperity spreading close to the first face of the nonconductive membrane, and formed by a porous material having approximately the same shape as the interior of the anode chamber, and arranged within the anode chamber, and a second electro-conductive support material having a rough surface which has asperity spreading close to the second face of the nonconductive membrane.

18 Claims, 4 Drawing Sheets

(56) References Cited

FOREIGN PATENT DOCUMENTS

| | | |
|---|---|---|
| JP | 2006-159112 | 6/2006 |
| JP | 2007-95470 | 4/2007 |
| WO | 01/04061 A1 | 1/2001 |

OTHER PUBLICATIONS

Peter Aelterman et al., "Continuous Electricity Generation at High Voltages and Currents Using Stacked Microbial Fuel Cells," Environmental Science & Technology, vol. 40, No. 10, 2006, pp. 3388-3394.

Bruce Logan et al., "Graphite Fiber Brush Anodes for Increased Power Production in Air-Cathode Microbial Fuel Cells," Environmental Science & Technology, vol. 41, No. 9, 2007, pp. 3341-3346.

Korneel Rabaey et al., "Tubular Microbial Fuel Cells for Efficient Electricity Generation," Environmental Science & Technology, vol. 39, No. 20, 2005, pp. 8077-8082.

Zhen He et al., "An Upflow Microbial Fuel Cell with an Interior Cathode: Assessment of the Internal Resistance by Impedance Spectroscopy," Environmental Science & Technology, vol. 40, No. 17, 2006, pp. 5212-5217.

Yi Zuo et al., "Tubular Membrane Cathodes for Scalable Power Generation in Microbial Fuel Cells," Environmental Science & Technology, vol. 41, No. 9, 2007, pp. 3347-3353.

Japanese Office Action issued Feb. 5, 2013 in corresponding Japanese application No. 2007-329691.

Zhen He, et al., "Electricity Generation from Artificial Wastewater Using an Upflow Microbial Fuel Cell", Environ. Sci. Technol., 2005, vol. 39, No. 14, p. 5262-5267.

Japanese Office Action mailed Jun. 11, 2013 in corresponding Japanese Application No. 2007-329691.

* cited by examiner

MICROBIAL POWER GENERATION DEVICE

CROSS-REFERENCE TO RELATED APPLICATIONS

This is a continuing application, filed under 35 U.S.C. §111(a), of International Application PCT/JP2008/072385, filed Dec. 10, 2008, it being further noted that foreign priority benefit is based upon Japanese Patent Application 2007-329691, filed Dec. 21, 2007, the entire disclosures of which are incorporated herein by reference.

BACKGROUND

1. Field

The present invention is related to a power generation device which uses a metabolic reaction of a microbe. In particular, the present invention is related to a microbial power generation device which extracts the reducing power obtained when a microbe decomposes an organic substrate by oxidation as electrical energy.

2. Description of the Related Art

In recent years, the requirements for a power generation method that takes into account the global environment are increasing and the technological development of microbial power generation is progressing. Microbial power generation is a method of generating power by extracting the reducing power obtained when microbes assimilate organic substances as electrical energy.

Generally, in microbial power generation, microbes and organic substances which are assimilated by the microbes coexist within an anode chamber arranged with an anode. In addition, depending on the case, an electron transport substances or materials (electron mediator) are added into the anode and/or the anode chamber and receives the electrons which are generated when the microbes oxidize the organic substances, and passes the electrons to the anode. The anode is electrically conductive with a cathode through an external circuit, and the electrons which are passed to the anode move to the cathode and are passed to an electron acceptor through the cathode. A current flows between the cathodes and the anodes due to the movement of the electrons and electrical energy is obtained.

In microbial power generation, because an electron mediator directly extracts electrons from microbes the theoretical energy conversion efficiency is high. However, the actual energy conversion efficiency is low and therefore improvements in power generation rates are required. Thus, various examinations and developments are being undertaken with respect to the material and structure of electrodes, the type of electron mediator and the selection of the species of microbe in order to increase power generation rates (for example, refer to Japanese Laid Open Patent 2007-95470, and P. Aelterman et al., 2006 ENVIRONMENTAL SCIENCE & TECHNOLOGY, Vol. 40, No. 10, pp. 3388-3394). In Japanese Laid Open Patent 2007-95470, a power generation rate is improved by using an anode which is introduced with a functional group binding chemically with an electron mediator.

In Japanese Laid Open Patent 2007-95470, electrons which are produced when microbes oxidize an electron donor (organic substances) are extracted to an anode via an electron mediator. As a result, it is necessary to supply not only the electron donor to an anode chamber but also the electron mediator. In addition, because an additional process which introduces a functional group to the anode is necessary the manufacturing costs of the anode increase. Consequently, a new technology for improving the power generation rate which does not lead to an increase in costs is being demanded. In addition, adverse effects on the microbial reaction may be generated depending on the type of mediator.

SUMMARY

The inventors of the present invention discovered that preventing a short pass of influent within an anode chamber by allowing an electroconductive support material which maintains microbial growth to exist within the anode chamber contributes to an improvement in efficiency of microbial power generation. In addition, the inventors discovered that by adhering a nonconductive membrane which separates the anode chamber and a cathode chamber with electrodes arranged on each of the anode chamber and cathode chamber respectively, the movement of electrons and protons ($H^+$) which are generated by a microbial reaction is accelerated and power generation efficiency is improved. Specifically, the present invention provides the following.

(1) A microbial power generation device including an anode chamber which maintains a microbe and which is supplied with influent including an electron donor, a cathode chamber supplied with an electron acceptor, a nonconductive membrane having a first face and an opposing second face and arranged between the anode chamber and the cathode chamber, a first electro-conductive support material having a rough surface which has asperity spreading close to the first face of the nonconductive membrane, and formed by a porous material having approximately the same shape as the interior of the anode chamber, and arranged within the anode chamber, and a second electro-conductive filling material having a rough surface which has asperity spreading close to the second face of the nonconductive film.

(2) The microbial power generation device described in (1), wherein a microbial layer is formed between the rough surface of the first electro-conductive support material and the first face of the nonconductive membrane, and the influent is supplied to the microbial layer by passing through the porous material.

(3) The microbial power generation device described in (1), wherein the first electro-conductive support material and the second electro-conductive support material are pressed against the nonconductive membrane and adhered in a state in which the asperity of the rough surface of the first electro-conductive support material and the second electro-conductive support material are supported.

(4) The microbial power generation device described in (3), wherein the first electro-conductive support material is adhered to the nonconductive membrane by applying pressure of 0.01 $g/cm^2$ or more and 100 $g/cm^2$ or less.

(5) The microbial power generation device described in (4), wherein the first electro-conductive support material has elasticity, is formed larger than the internal shape of the anode chamber, is compressed and is filled into the anode chamber.

(6) The microbial power generation device described in (4), wherein the nonconductive membrane and the first electro-conductive support material are pressure connected by a tightening component or by inserting a spacer between them within the anode chamber.

(7) The microbial power generation device described in (1), wherein the first electro-conductive support material is formed by at least one of a porous sheet, a porous felt, a foam product or a porous body having the same shaped polygon lined in a row, having a material of at least one of felt, graphite, titanium or stainless steel.

(8) The microbial power generation device described in (1), wherein the first electro-conductive support material is a porous solid formed in a plate shape having a thickness of 3 mm or more and 40 mm or less.

(9) The microbial power generation device described in (8), wherein the solid is a stacked layer body formed by a porous graphite integral molding object or by attaching together a plurality of porous graphite sheets.

(10) The microbial power generation device described in (9), wherein the stacked layer body is attached together by a conductive adhesive.

(11) The microbial power generation device described in (1), wherein the second electro-conductive support material is a solid formed in a plate shape.

(12) The microbial power generation device described in (11), wherein the solid is a stacked layer body formed by a porous graphite integral molding object or by attaching together a plurality of porous graphite sheets.

(13) The microbial power generation device described in (11), wherein the solid supports platinum, manganese or cobalt on a stacked layer body formed from by a porous graphite integral molding object or by attaching together a plurality of porous graphite sheets.

(14) The microbial power generation device described in (1), wherein the influent includes a nitrogen source and a phosphorus source.

(15) The microbial power generation device described in (14), wherein the influent does not include an electronic mediator.

(16) The microbial power generation device described in (15), wherein the influent has an organic substance concentration of 100 mg/L or more and 10,000 mg/L or less.

(17) The microbial power generation device described in (1), wherein the anode chamber does not include mediator.

(18) The microbial power generation device described in (17), wherein the anode chamber maintains microbes with a microbial concentration of 1 g/L or more.

(19) The microbial power generation device described in (1), wherein the anode chamber includes an influent port and an effluent port which are arranged with an inlet from which the influent flows in, and an outlet from which the influent flows out, and the first electro-conductive support material comprised from a stacked layer body formed by attaching together a plurality of porous graphite sheets is arranged to intersect a stacked layer surface with respect to the wall surface.

(20) The microbial power generation device described in (1), wherein the nonconductive membrane is a cationic ion exchange membrane or an anionic ion exchange membrane.

According to the present invention it is possible to improve the power generation efficiency of microbial power generation.

DETAILED DESCRIPTION

The present invention is explained below while referring to the diagrams. In the diagrams, the same reference symbols are attached to the same components and therefore some explanations are omitted or simplified. The drawings show an exemplary view of the structure of the present invention with parts of the structure omitted or simplified and the sizes are not always the same as the actual device.

Figure 1:
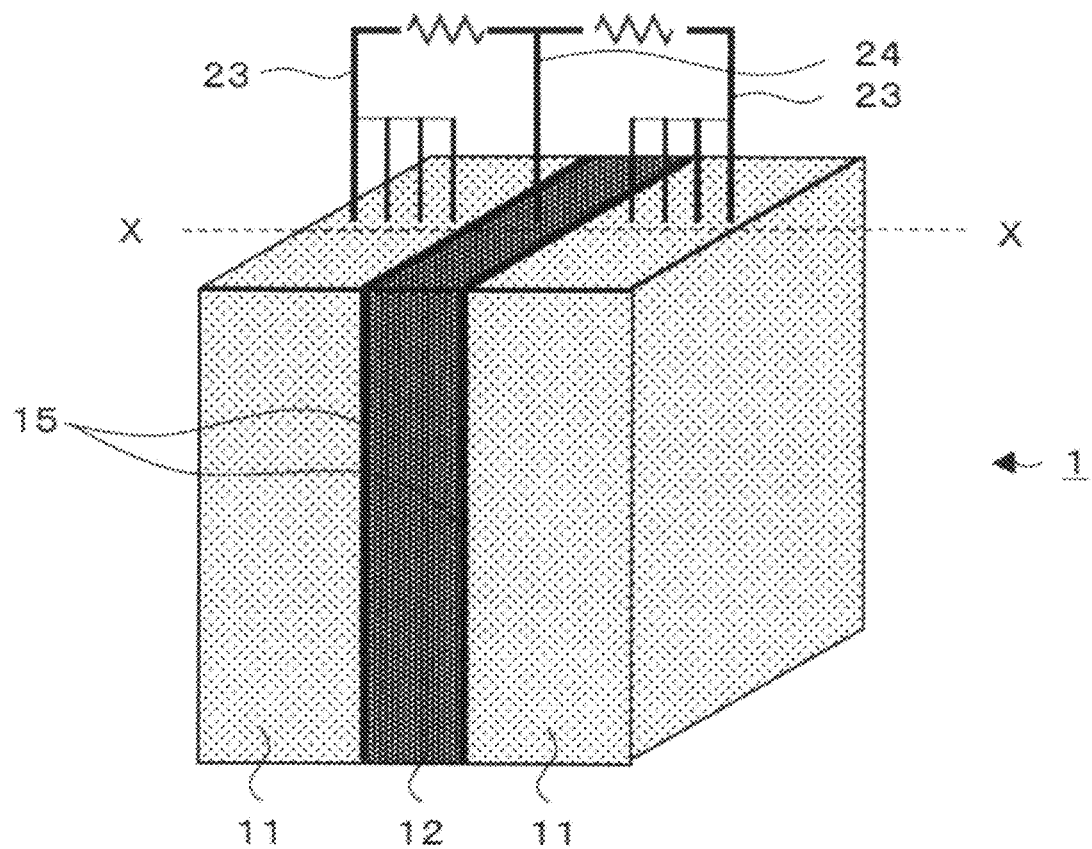
FIG. 1 is an overall exemplary diagram of a microbial power generation device related to one embodiment of the present invention.
Figure 2:
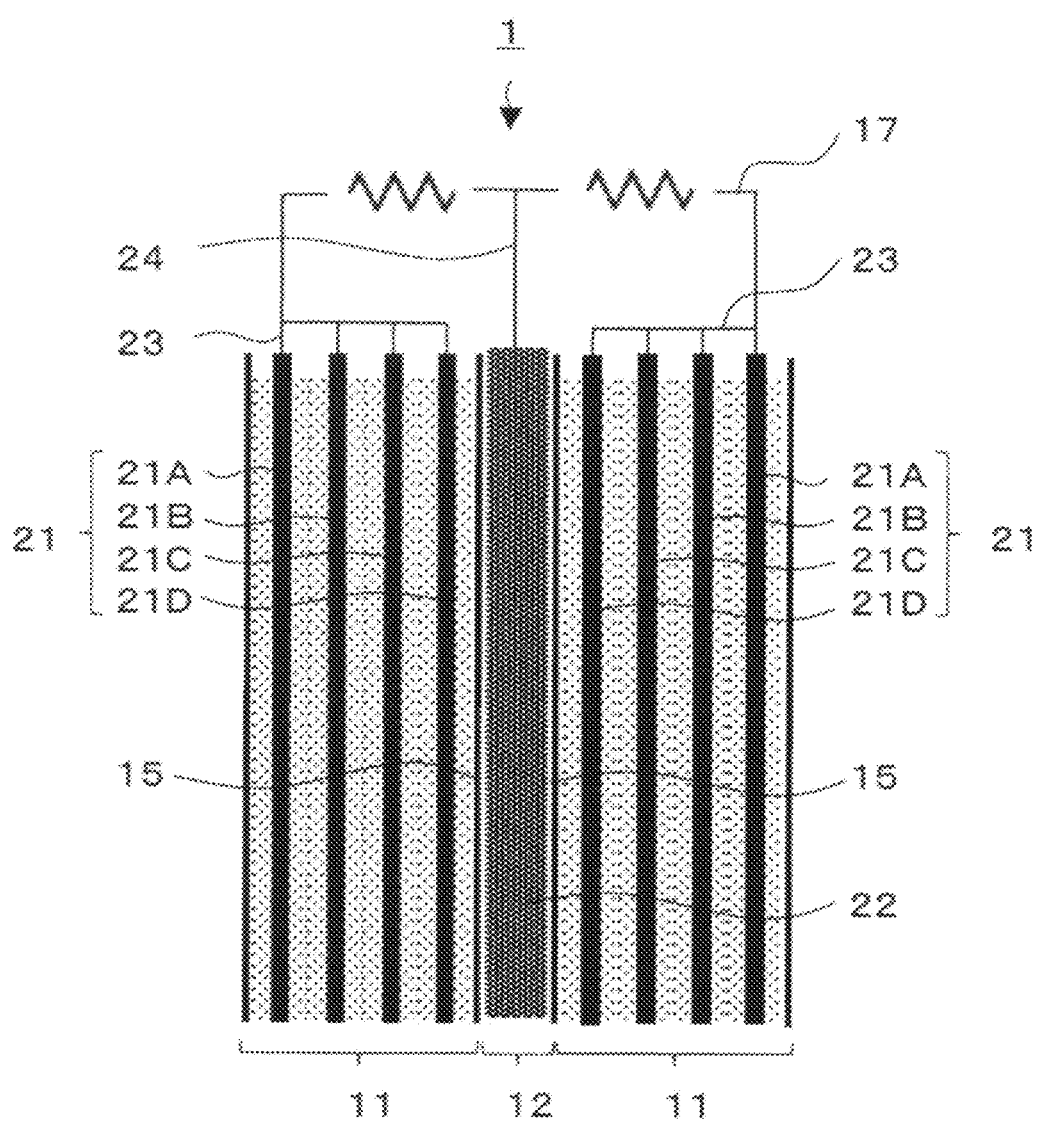
FIG. 2 is a cross sectional diagram of the line X-X in the microbial power generation device.
Figure 3:
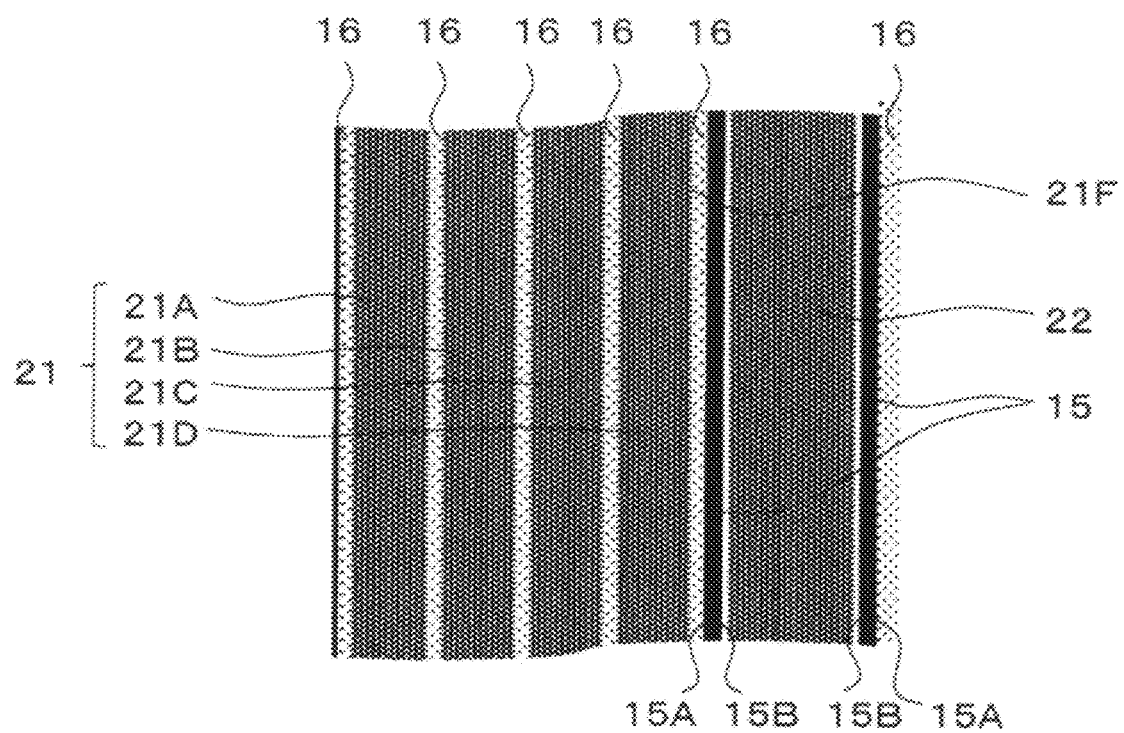
FIG. 3 is an expanded view diagram of one part of the microbial power generation device.

FIG. 1 is an oblique view diagram which shows an overview of a microbial power generation device 1 related to one embodiment of the present invention. FIG. 2 is a cross sectional diagram of the line X-X in the power generation device and FIG. 3 is a partial expanded view of FIG. 2. The power generation device 1 is formed by arranging one cathode chamber 12 between two anode chambers 11. A nonconductive membrane 15 is arranged between the anode chamber 11 and the cathode chamber 12.

It is possible to favorably use a cationic permeable membrane with a proton selectivity as the nonconductive membrane 15, for example, it is possible to use Nafion (registered trademark) made by Du Pont Co., Ltd. It is preferred that the nonconductive membrane 15 be thin and strong. In addition, it is also possible to use an anionic permeable membrane with anionic selectivity.

Each anode chamber 11 is roughly square shaped and a first conductive support material 21 is arranged within each chamber. The first conductive support material 21 is a solid formed by a conductive material (graphite, titanium, stainless steel etc) and its entire shape is formed to be almost the same as the interior of the anode chamber 11. The first conductive support material 21 is preferred to have a thickness of 3 mm or more and 40 mm or less and particularly 5-20 mm, and having porous characteristics and having gaps with a diameter of 0.01-1 mm formed over the entire material.

As this type of first conductive support material 21, a porous sheet (for example, graphite felt) formed from a conductive material, a foam product formed from a conductive material, or a porous solid (for example, a lattice or honeycomb) having the same shaped polygon (a box, hexagon, octagon) lined in a row are examples. A plurality of porous sheets may be stuck together with a conductive adhesive to form the first conductive support material 21.

This type of first conductive support material 21 is arranged in each anode chamber 11 and allowed to exist over the entire interior. Because the first conductive support material 21 is essentially the same size as the internal shape of the anode chamber 11 the first conductive support material 21 may exist over the entire anode chamber 11. In addition, a conductive material having flexibility such as graphite felt and slightly larger than the internal shape of the anode chamber 11 may be compressed into the anode chamber 11. Furthermore, a conductive material slightly smaller than the anode chamber 11 may be arranged in the anode chamber 11 and the first conductive support material 21 may be arranged over the entire anode chamber 11 by narrowing the interior of the anode chamber 11 by inserting spacers into the gaps.

Microbes are maintained on the surface and the interior of the first conductive support material 21. The influent supplied to the anode chamber 11 passes into the anode chamber 11 via the porous first conductive support material 21 and an electron donor (organic substances) is supplied to the microbes maintained on the first conductive support material 21. In other words, the present invention is structured so that a phenomenon (short pass) whereby the influent passes through the space where the conductive support material 21 does not exist does not occur.

In the anode chamber 11, a microbial reaction is performed in which electrons are extracted from an electron donor in a state in which the microbes are mainly maintained by the first conductive support material. In this way, if a short pass is prevented, the influent is prevented from flowing out without being used by the microbes, and because the influent is supplied to the microbes by dispersion after passing through the interior of the porous first conductive support material 21, it is possible to increase the efficiency of microbial power generation.

In the present embodiment, four graphite felt sheets 21A-21D are stuck together and becomes the first conductive support material 21 which is one sheet of a plate shaped porous material having almost the same shape as the interior of the anode chamber 11. The surface of the first conductive support material 21 (below called "contact surface") 21F which faces the nonconductive membrane 15 is adhered across the entire first surface 15A of the nonconductive membrane 15. Because the contact surface 21F of the first conductive support material 21 and the first surface 15A of the nonconductive membrane 15 are attached completely together, it is preferred that the first conductive support material 21 is a flat plate shape having a straight flat surface in which the contact surface does not curve. In the present embodiment, one side of a graphite felt sheet 21D which is one of the graphite felt sheets in the outermost layer becomes the contact surface 21F and this is a flat and rough surface which does not bend.

It is preferred that the first conductive support material be adhered by being pressed by the nonconductive membrane 15 in a state in which a light pressure (about 0.01-100 g/cm2, and in particular about 0.1-10 g/cm2) is applied between the contact surface 21F of the first conductive support material 21 and the first surface 15A of the nonconductive membrane 15. For example, the first conductive support material 21 and the nonconductive membrane 15 are pressed together using a tightening part such as a screw or clip. Alternatively, a spacer may be inserted in the anode chamber 11 and the first conductive support material 21 may be formed slightly larger than the interior of the anode chamber and compressed into the anode chamber 11. It is possible to attach a sufficient amount of microbes between the first conductive support material 21 and the nonconductive membrane 15 when an electron donor is present if this amount of pressure bonding is used. It is more preferable if the two surfaces are attached in a state in which the fine asperity of the surface of the conductive support material which is porous and has a rough surface is supported. That is, it is not preferred that the first conductive support material 21 and the nonconductive membrane 15 are formed as one unit (adhered) using fluid material such as adhesive so that the asperity of the surface of the conductive support material is filled in.

Furthermore, when a granular graphite for example is filled as the conductive support material into the anode chamber, the adhesion between the conductive support material and the nonconductive membrane within the anode chamber can not be secured and the influent is more likely to short pass within the anode chamber. Consequently, a molded object which can be formed to roughly the same shape as the shape of the interior of the anode chamber is used as the first conductive support material as stated above. Not only a single unit molded object which is molded into a predetermined shape by foaming the conductive support material but also a stacked object stacked with a plurality of sheets may be included in this molded object.

The influent which includes organic substances (for example, acetic acid) as an electron donor from which electrons are extracted using oxidation decomposition by microbes, is supplied to the anode chamber 11 in which the above stated first conductive support material 21 is arranged.

The influent is supplied from an inlet formed in the anode chamber 11 and is discharged from an outlet formed on the opposite side of the inlet.

It is preferred that influent include a nitrogen source and a phosphorus source which are nutrient sources of the microbes other than organic substances which becomes the electron donor as the influent which includes an electron donor. It is possible to use various organic waste or organic effluent (sewage water or food effluent) as the influent including an electron donor. The present invention is formed by a conductive porous material with a large specific surface area which is attached to the nonconductive membrane 15 and a microbial layer is formed between them, and organic substances (electron donor) is supplied to the microbe in the process where the influent passes through the porous material. By adopting this structure, it is assumed that microbes can directly pass electrons to the anode and an electronic mediator is no longer necessary.

The microbes and organic substances are not particularly limited. A microbial reaction within the anode chamber 11 is performed under anaerobic conditions and the type of microbes maintained within the anode chamber 11 is not particularly limited. Activated sludge obtained from a biological processing tank which processes water containing organic substances such as sewage water, microbes included in the discharge effluent from a primary sedimentation tank of the sewage water, and an anaerobic digestion sludge are supplied to the anode chamber 11 as a seed and it is possible to maintain the microbes. In addition, in order to increase power generation efficiency, it is preferred that the amount of microbes maintained within the anode chamber 11 have a high concentration, for example, microbial concentration of 1 g/L or more is preferred. Furthermore, because it is possible to increase power generation efficiency with a higher concentration of electron donors (organic substances) which are oxidation decomposed by a microbial reaction within the anode chamber, the organic substance concentration of the influent which is supplied to the anode chamber is preferred to be about 100-10,000 mg/L.

The electrons which are generated when organic substances are oxidized by the microbes are extracted to the exterior of the anode chamber 11 with the first conductive support material 21 as an anode. The first conductive support material 21 is a porous material formed from a conductive material and functions as an anode as stated above. If the thickness of the first conductive support material 21 is less than 3 mm, the amount of maintained microbes decreases. However, when the thickness of the first conductive support material 12 exceeds 40 mm, the movement of protons produced by a microbial reaction becomes less. As a result, because the microbes (sulfur reducing bacteria or methanogenic bacteria) which do not contribute to microbial power generation become dominant within the anode chamber 11, it is not preferred.

In the present embodiment, four graphite felt sheets 21A-21D which form one first conductive support material 21 are arranged in a line with respect to a pair of wall faces on which the inlet and outlet are arranged, and are also arranged so as to intersect a wall face. Consequently, the influent which is supplied from the inlet flows between opposing graphite felt sheets so that it may be transmitted to the surface of each of the graphite felt sheets, and supplied to the microbes by dispersing after simultaneously passing through the interior of the graphite felt sheets. The microbes are responsible for a microbial reaction in which organic substances which are included in the influent which is supplied from the inlet and discharged from the outlet becomes an electron donor in the anode chamber 11.

In order to extract the electrons obtained by oxidation decomposition of organic substances by microbes, an anode lead line 23 is connected to each graphite felt sheet 21A-21D. The anode lead line 23 is formed by a conductive material such as a metal wire. The anode lead line 23 is electrically connected with a cathode lead line 24 described below via a conduction wire 17. By adopting this structure, the electrons which are produced in the anode chamber 11 are transferred to the cathode chamber 12 via the first conductive support material 21, the anode lead line 23, the conduction wire 17 and the cathode lead line 24.

A second conductive support material 22 which functions as a cathode is arranged in the cathode chamber 12. The material which forms the second conductive support material 22 may be appropriately selected depending on the type of electron acceptor. For example, it is preferred that platinum be used in the case where oxygen is used as the electron acceptor, for example, platinum, manganese or cobalt can be supported with graphite felt as a substrate. Depending on the type of material used as the electron acceptor, a cheap graphite electrode can be used unchanged (that is, without supporting a catalytic metal such as platinum) as the cathode.

A cathode lead line 24 is connected to the second conductive support material 22. In addition, the second conductive support material 22 is attached to the entire surface of the second surface 15B of the nonconductive membrane 15. It is preferred that the second conductive support material 22 is a flat plate shape having a straight flat surface which does not curve the same as the first conductive support material so that the rough surface which faces the nonconductive membrane 15 is attached to the second surface 15B. In the present invention, the second conductive support material 22 is formed by one sheet of graphite felt and has a thickness of about 2-5 mm, and in particular 3 mm, and the surface which faces the second conductive support material 22 is a rough surface which has fine asperity and is flat and does not curve.

It is preferred that second conductive support material 22 closely contact as much as possible with the nonconductive membrane 15. By adhering the second conductive support material 22 and the nonconductive membrane 15 together, it is possible to move H$^+$ from the anode chamber 11 via the nonconductive membrane 15 and accelerate a reaction which reduces in the cathode chamber 12. The second conductive support material 22 and the nonconductive membrane 15 may be adhered by inserting a tightening member or attached by welding, or coating an adhesive. In addition, a spacer may be inserted into the cathode chamber 12 and the second conductive support material 22 may be slightly larger than the interior of the anode chamber and compressed into the cathode chamber 12. A reduction reaction in the cathode chamber 12 is performed using a microbial reaction. However, in the case where microbes are not used, it is not necessary to maintain microbes within the cathode chamber 12. As a result, the second conductive support material 22 may be attached to the nonconductive membrane 15 using an adhesive.

It is preferred that at least the surface of the second conductive material 22 which contacts with the nonconductive membrane 15 is a rough surface formed with fine asperity. The porous material which is formed by a conductive material is formed entirely with air gaps, and the surface of the porous material has a rough surface with fine asperity via the air gaps, and because a cathode solution is dispersed after passing through the interior of the porous material, it is also possible to favorably use the porous material (for example, graphite felt) formed by a conductive material, as the second conductive support material 22 as well as the first conductive support material 21.

In the present embodiment, a solution including potassium hexacyanoferrate trihydrate (II) (potassium ferricyanide) is supplied to the cathode chamber 12 as an electron acceptor, and graphite felt is used as the second conductive support material which functions as a cathode. Manganese, steel and nitric acid may be used as the electron acceptor and in this case, porous graphite such as graphite felt may be used as the cathode.

The influent preferably including organic substances which becomes an electron donor and a nutrient source of a microbe are supplied to the anode chamber 11 and the pH of the influent within the anode chamber 11 is maintained at 7 or more and 9 or less and electrons and protons are produced by a microbial reaction. The temperature conditions of the anode chamber 11 are preferably from a normal temperature to a mid/high temperature, specifically, about 10° C.-70° C. If acetic acid is used as the electron donor, carbon dioxide, H$^+$ and electrons are produced by the reaction shown in the chemical formula below:

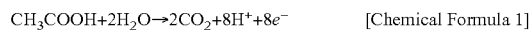
$$CH_3COOH+2H_2O \rightarrow 2CO_2+8H^++8e^-$$ [Chemical Formula 1]

The H+ which is produced passes through the nonconductive membrane 15 which makes the cation permeable and is moved to the cathode chamber 12. On the other hand, a solution which includes about 10-200 mM of an electron acceptor (for example, potassium ferricyanide) and a phosphoric acid buffer is supplied in the cathode chamber 12 as a cathode solution and electrons, protons and the electron acceptor are reacted. A gas which includes oxygen instead of the cathode solution may be aerated in the cathode chamber 12, a phosphoric acid buffer may be filled into the chamber and oxygen may be blown in to the chamber and reacting the electrons and protons with oxygen as the electron acceptor.

If potassium ferricyanide is used as the electron acceptor, electrons and protons are consumed by a reduction reaction in the cathode chamber by the chemical formula below:

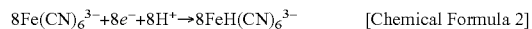
$$8Fe(CN)_6^{3-}+8e^-+8H^+ \rightarrow 8FeH(CN)_6^{3-}$$ [Chemical Formula 2]

In the case where platinum for example is used as the cathode and oxygen as the electron acceptor, a reduction reaction may be performed by the chemical formula below:

$$2O_2+8H^++8e^- \rightarrow 4H_2O$$ [Chemical Formula 3]

The electrons produced in the anode chamber 11 by this type of reaction are extracted from the first conductive support material 21 which functions as an anode, and are transmitted to the second conductive support material 22 via the anode lead line 23 and the cathode lead line 24. In this process, a current flows between the first conductive support material 21 (anode) and the second conductive support material 22 (cathode) and it is possible to generate power.

EXAMPLES

Figure 4:
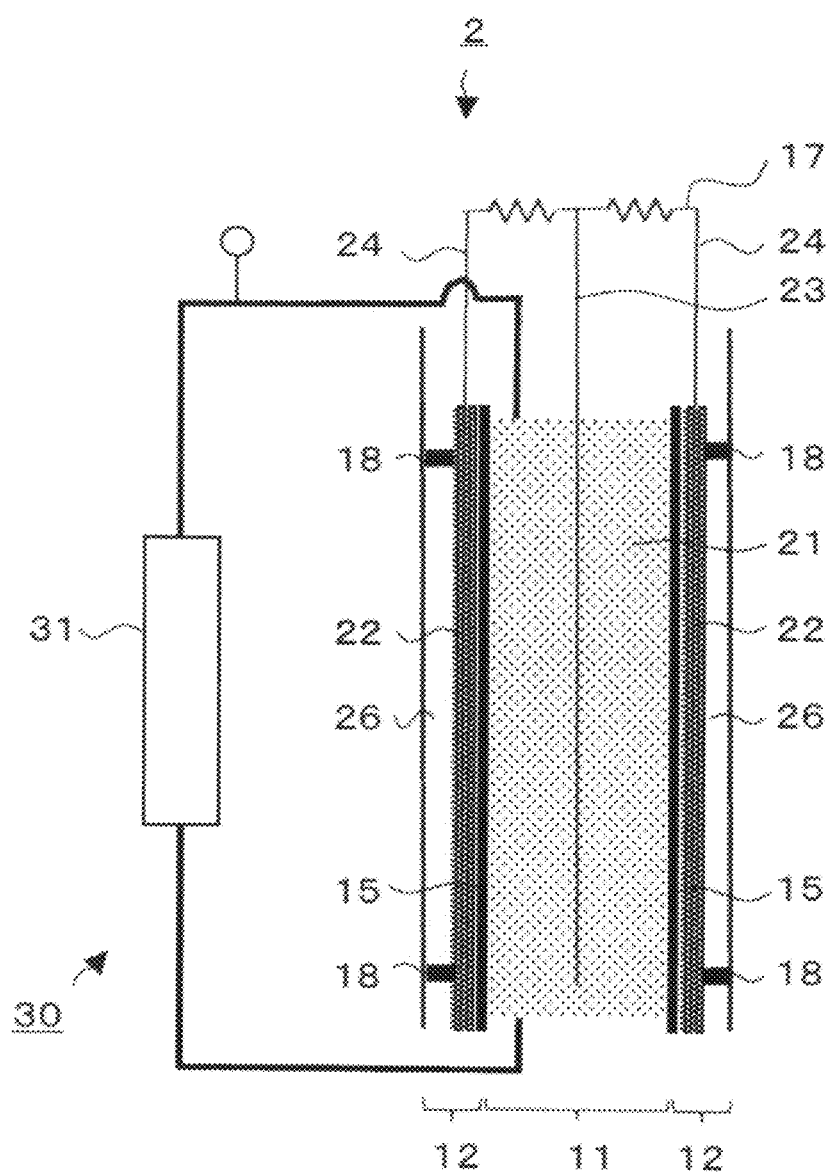
FIG. 4 is a structural diagram of a microbial power generation device used in an experiment.

A microbial power generation device 2 shown in FIG. 4 was assembled as example 1. The power generation device 2 is comprised by inserting a anode first conductive support material 21 between two cathode second conductive support materials 22, and the total volume is 1050 mL, with the volume of the anode chamber 11 being 700 mL and each cathode chamber 12 being 175 mL. A circulation path 30 arranged with a circulation tank which circulates a discharge effluent from the anode chamber 11 is arranged on the power generation device 2, a pH adjustment means 31 which adjusts the pH of a solution which flows in the circulation path is arranged and the pH of the solution within the anode chamber 11 is maintained at 7 or more and 9 or less. An alkali injection device is used as the pH adjustment means 31.

The first conductive support material 21 is formed by sticking together four sheets of graphite felt (made by Toyo Carbon Co., Ltd) having a thickness of 1 cm with a conductive adhesive, the same as the power generation device 1. By partially (about 10% of the total surface) coating (what is called avoiding "all coating") the adhesive on the surface of a graphite felt sheet, fine asperity of the surface of graphite felt sheets which face each other are not completely filled with the adhesive.

Each graphite felt sheet is a rectangle 250 mm×70 mm and both surfaces are rough. The first conductive support material 21 has a total volume of 700 $cm^3$, has almost the same shape as the interior of the anode chamber 11, and there is essentially no space within anode chamber 11. Therefore, a solution which is supplied to the anode chamber 11 flows through the first conductive support material 21 and essentially short pass does not occur. Activated sludge which is obtained from a biological processing tank of a sewage processing factory as a seed is added to the anode chamber 11 and cultivated and microbes are attached to the surface of each graphite felt sheet. In this way, a four layered graphite felt layer and a five layered microbial layer 16 are formed in the anode chamber 11, and the microbial concentration within the anode chamber 11 is about 2, 200 mh/L.

On the other hand, the cathode second conductive support materials 22 are both formed by one sheet of 3 mm thick graphite felts. Other than thickness, the second conductive support material 22 have the same structure as the anode graphite felt sheets and both surface are rough.

A cationic permeable membrane (Nafion made by Dupont Co., Ltd) is arranged as the nonconductive membrane 15 between the anode first conductive support material 21 and the cathode second conductive support material 22. A 5 mm thick honeycomb spacer (omitted from the diagram) is inserted intro the anode chamber 11, the first conductive support material 21 is pressed against the nonconductive membrane 15 and attached to the nonconductive membrane. The second conductive support material 22 is also pressed against the nonconductive membrane 15 using a 5 mm thick honeycomb spacer 18 and attached to the nonconductive membrane 15.

A solution chamber 26 in which a cathode solution flows is arranged on the opposite side of the side among the surfaces of the second conductive support materials 22 which contacts with the nonconductive membrane 15 in the cathode chamber 12. A cathode solution including 50 mM of potassium ferricyanide and phosphoric acid buffer are supplied as an electron acceptor with a flow rate of 70 mL/min to the solution chamber 26. On the other hand, a solution which includes acetic acid of density of 1,000 mg/L, 50 mM of phosphoric acid buffer and ammonium chloride are supplied with a flow rate of 70 mL/min to the anode chamber 11.

An anode lead line 23 is connected to the first conductive support material 21 and a cathode lead line 24 is connected to the second conductive support material 22, and the anode lead line 23 and the cathode lead line 24 are electrically conducted. The anode lead line 23 and the cathode lead line 24 are formed from stainless steel wires.

When microbial power generation was carried out under the above conditions, the voltage generated was 310 mV and the current was 1120 mA. That is, the amount of power generated per anode unit volume was 496 $W/m^3$. At this time, the circuit resistance was 0.5Ω.

Example 2

In example 2, a single sheet of graphite felt (3 mm thick) is used as the first conductive support material instead of the first conductive support material used in example 1. In addition to this, the size of the anode chamber 11 was changed to 52.5 mL and the graphite felt used as the first conductive support material was used so that the entire anode chamber was filled. Conditions other than these were the same as in example 1. When microbial power generation was carried out, the voltage generated was 305 mV and the current was 610 mA. At this time, the circuit resistance was 0.5Ω.

Comparative Example 1

In comparative example 1, the single sheet of 3 mm graphite felt used in example 2 was arranged in the anode chamber (the same size as the anode chamber in example 1) having a volume of 700 mL. In addition, the spacer inserted between the second conductive support material and the nonconductive membrane was removed. Conditions other than these were the same as in example 1. When microbial power generation was carried out, the voltage generated was 310 mV and the current was 15.5 mA. At this time, the circuit resistance was 20Ω.

As stated above, with the present invention it is possible to generate power with high power generation efficiency using microbes.

The present invention can be used in power generation using microbes.

What is claimed is:

1. A microbial power generation device comprising:
   an anode chamber which maintains microbes and which is supplied with influent which includes an electron donor;
   a cathode chamber supplied with an electron acceptor;
   a cationic permeable membrane having a first face and an opposing second face and arranged between the anode chamber and the cathode chamber;
   a first electro-conductive support material having a rough surface which has asperity contacting the first face of the cationic permeable membrane, and being a plate-shaped porous member that comprises at least one of a sheet product, a foam product, or a solid with a lattice or honeycomb form, the first electro-conductive support material having a material of at least one of graphite, titanium or stainless steel, having approximately the same shape and size as the interior of the anode chamber, and arranged within the anode chamber; and
   a second electro-conductive support material having a rough surface which has asperity spreading close to the second face of the cationic permeable membrane.

2. The microbial power generation device according to claim 1, wherein the microbes are maintained on the surface and in the interior of the first electro-conductive support material, and the influent is supplied to the microbes by passing through the first electro-conductive support material.

3. The microbial power generation device according to claim 1, wherein the first electro-conductive support material and the second electro-conductive support material are pressed against the cationic permeable membrane and adhered in a state in which the asperity of the rough surface of the first electro-conductive support material and the second electro-conductive support material are supported.

4. The microbial power generation device according to claim 3, wherein the first electro-conductive support material is adhered to the cationic permeable membrane by applying pressure of 0.01 $g/cm^2$ or more and 100 $g/cm^2$ or less.

5. The microbial power generation device according to claim 4, wherein the first electro-conductive support material has elasticity, is formed larger than the internal shape of the anode chamber, is compressed and is filled into the anode chamber.

6. The microbial power generation device according to claim 4, wherein the cationic permeable membrane and the first electro-conductive support material are pressure connected by a tightening component or by inserting a spacer between them within the anode chamber.

7. The microbial power generation device according to claim 1, wherein the first electro-conductive support material is a solid formed in a plate shape having a thickness of 3 mm or more and 40 mm or less.

8. The microbial power generation device according to claim 7, wherein the solid is a stacked layer body formed by a porous graphite integral molding object or by attaching together a plurality of porous graphite sheets.

9. The microbial power generation device according to claim 8, wherein the stacked layer body is attached together by a conductive adhesive.

10. The microbial power generation device according to claim 1, wherein the second electro-conductive support material is a solid formed in a plate shape.

11. The microbial power generation device according to claim 10, wherein the solid is a stacked layer body formed by a porous graphite integral molding object or by attaching together a plurality of porous graphite sheets.

12. The microbial power generation device according to claim 10, wherein the solid supports platinum, manganese or cobalt on a stacked layer body formed from by a porous graphite integral molding object or by attaching together a plurality of porous graphite sheets.

13. The microbial power generation device according to claim 1, wherein the influent includes a nitrogen source and a phosphorus source.

14. The microbial power generation device according to claim 13, wherein the influent does not include an electronic mediator.

15. The microbial power generation device according to claim 14, wherein the influent has an organic substance concentration of 100 mg/L or more and 10,000 mg/L or less.

16. The microbial power generation device according to claim 1, wherein the anode chamber does not include a functional group.

17. The microbial power generation device according to claim 16, wherein the anode chamber maintains microbes with a microbial concentration of 1 g/L or more.

18. The microbial power generation device according to claim 1, wherein the anode chamber includes an influent port and an effluent port which are arranged with a inlet from which the influent flows in, and a outlet from which the influent flows out, and the first electro-conductive support material comprised from a stacked layer body formed by attaching together a plurality of porous graphite sheets is arranged to intersect a stacked layer surface with respect to the wall surface.

* * * * *